United States Patent
Tsai

(12) 
(10) Patent No.: US 6,252,998 B1
(45) Date of Patent: Jun. 26, 2001

(54) METHOD FOR ADJUSTING RESOLUTION OF A SCANNING MODULE

(75) Inventor: Jeun-Tsair Tsai, Taipei Hsien (TW)

(73) Assignee: Mustek System Inc., Hsin-Chu (TW)

( * ) Notice: Subject to any disclaimer, the term of this patent is extended or adjusted under 35 U.S.C. 154(b) by 0 days.

(21) Appl. No.: 09/148,053

(22) Filed: Sep. 3, 1998

(30) Foreign Application Priority Data

Jul. 31, 1998 (TW) .................................. 87112606

(51) Int. Cl.⁷ ........................................ G06K 9/32
(52) U.S. Cl. ......................... 382/298; 382/299; 382/295
(58) Field of Search ................... 382/298, 299; 358/474, 451, 428, 456, 484

(56) References Cited

U.S. PATENT DOCUMENTS 6,044,180 * 3/2000 Brandestini et al. ................. 358/274

* cited by examiner

Primary Examiner—Jerome Grant, II
Assistant Examiner—Negussie Worku
(74) Attorney, Agent, or Firm—Winston Hsu

(57) ABSTRACT

The present invention provides a resolution adjustment method for adjusting the resolution of a scanning module. The scanning module is installed in a scanner for scanning a document and comprises a case with a line-shaped opening on its top for receiving light from the document, a sensor installed in the case and comprising linearly arranged sensing units for scanning the light from the document and generating correspondent image signals, a lens installed in the case for converging the light from the document to the sensor, and a mirror module installed in the case for passing the light from the document through the lens to the sensor. The resolution adjustment method provides the scanning module with a calibration picture for generating a calibration image which comprises two groups of parallel lines in two directions for calibrating the resolutions of the sensor in the two different directions. Then, the magnitude of the image is measured corresponding to the two groups of parallel lines and the position of the scanning module is adjusted until the resolutions represented by the image signals corresponding to the two groups of parallel lines are roughly equal.

14 Claims, 5 Drawing Sheets

METHOD FOR ADJUSTING RESOLUTION OF A SCANNING MODULE

BACKGROUND OF THE INVENTION

1. Field of the Invention

The present invention relates to a scanning module resolution adjustment method, and more particularly, to a resolution adjustment method for adjusting resolutions of a scanning module in two perpendicular directions.

2. Description of the Prior Art

Resolution of a scanning module is commonly adjusted by modifying the position of the lens in the scanning module. To find the correct position of the lens for generating an optimal resolution, image signals generated by scanning a calibration picture using the scanning module are used.

The resolution of a scanning module has a horizontal directional component and a vertical directional component. Optimal resolutions as well as the optimal positioning of the lens to obtain the best resolution in the two directions are different due to aberrations of the lens. Therefore, the lens has to be positioned at a position that allows both of the horizontal and vertical resolutions to approach the optimal state.

The calibration picture used to calibrate the scanning module comprises a group of parallel vertical lines or slanted lines. The vertical lines generate images used to adjust the vertical resolution but not the horizontal resolution. Therefore, the vertical lines are appropriate only for calibrating a lens with identical horizontal and vertical resolutions. Slanted lines, on the other hand, generate images comprising both the vertical and horizontal resolutions. However, if the slanted lines incline more horizontally than vertically, the horizontal component will predominate and use of the generated image alone cannot separately calibrate the vertical and horizontal resolutions. Therefore, it may be very difficult to find the ideal position of the lens. This in turn lowers the yield.

SUMMARY OF THE INVENTION

It is therefore a primary objective of the present invention to provide a resolution adjustment method for adjusting the resolutions of a scanning module both in the horizontal and vertical directions to solve the above mentioned problem.

In a preferred embodiment, the present invention provides a resolution adjustment method for adjusting the resolution of a scanning module installed in a scanner for scanning a document, the scanning module comprising:

a case with a line-shaped opening on the top for receiving light from the document;

a sensor installed in the case having a plurality of linearly arranged sensing units for converting the light from the document through the line-shaped opening of the case into correspondent image signals;

a lens installed in the case for converging the light from the document onto the sensor; and a mirror module installed in the case for passing the light from the document to the sensor; the resolution adjustment method comprising the following steps:

(1) providing a calibration picture to the scanning module to generate a calibration image which comprises two groups of parallel lines of two different directions for calibrating the resolutions of the sensor in the two different directions;

(2) measuring the magnitude of the image signals generated by the sensor in scanning the two groups of parallel lines and adjusting the scanning module until the magnitude of the image signals corresponding to the two groups of parallel lines are roughly equal.

It is an advantage of the present invention that the vertical and horizontal resolutions of the scanning module can be adjusted separately and easily by using the two groups of parallel lines so as to make the two resolutions almost equal while increasing the yield.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
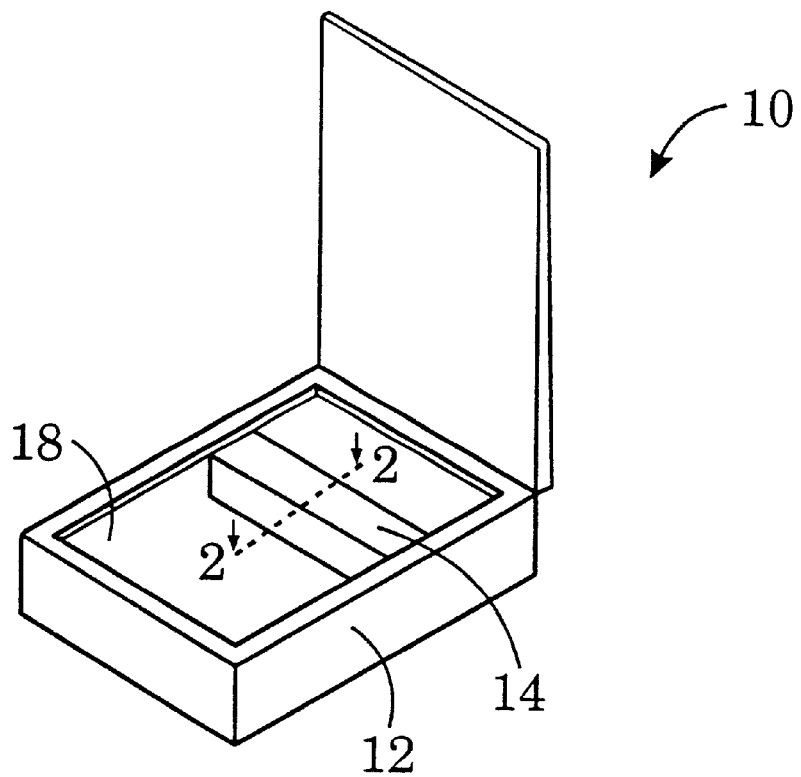
FIG. 1 is a schematic diagram of a scanner according to the present invention.

Please refer to FIG. 1. FIG. 1 is a schematic diagram of a scanner 10 according to the present invention. The scanner 10 comprises a housing 12 with a transparent platform 18 on the top for placing a document, a scanning module 14 movably installed in the housing 12 for scanning the document, a driving device (not shown) installed in the housing 12 for driving the scanning module 14 to scan the document, and a control device (not shown) installed in the housing 12 for controlling the operation of the scanner 10.

Figure 2:
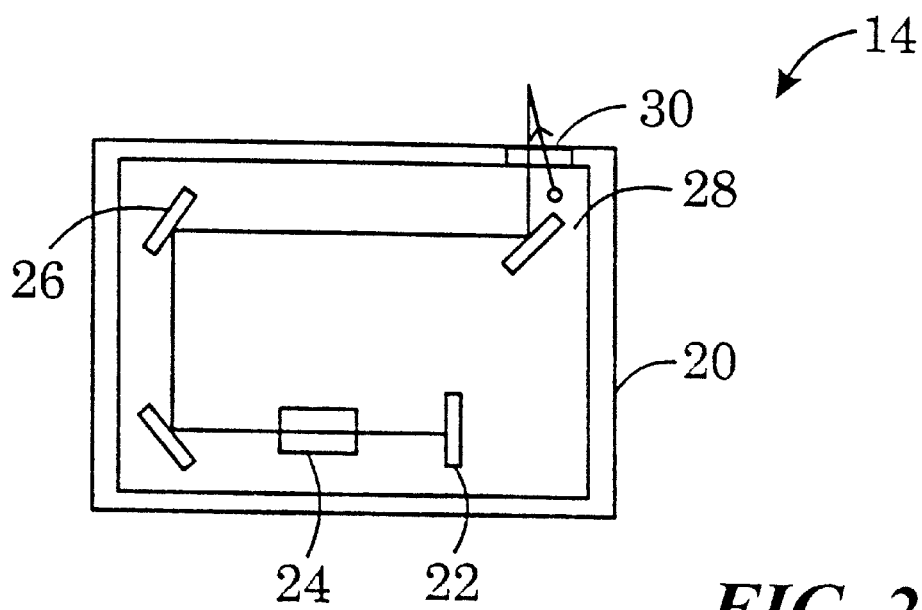
FIG. 2 is a sectional view along line 2—2 of the scanning module shown is FIG. 1.

Please refer to FIG. 2. FIG. 2 is a sectional view along line 2—2 of the scanner 14 shown in FIG. 1. The scanner 14 comprises a case 20 with a line-shaped opening 30 on the top for receiving the light from the document, a light source 28 installed in the case 20 for illuminating the document, a sensor 22 installed in the case 20 for converting the light from the document into correspondent image signals, a mirror module 26 installed in the case 20 for passing the light from the document to the sensor 24, and a lens 24 adjustably installed in the case 20 for converging the light from the document to the sensor 22. The sensor 22 is a linear charge coupled device and comprises a plurality of linearly arranged sensing units for scanning the light from the document through the line-shaped opening 30 and generating correspondent image signals.

Figure 3:
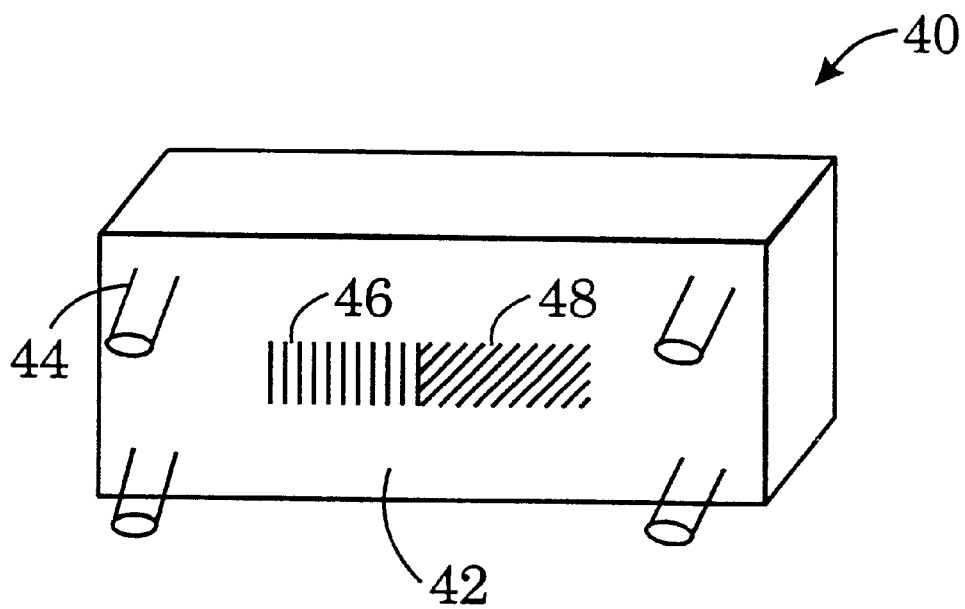
FIG. 3 is a perspective diagram of the calibration module shown in FIG. 1.
Figure 4:
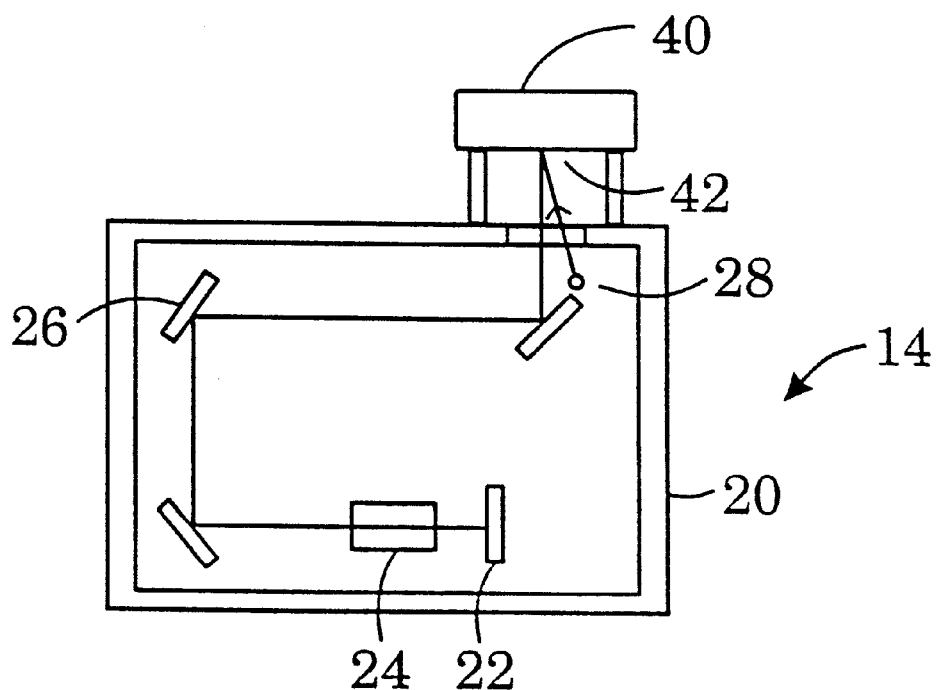
FIG. 4 is a schematic diagram of the scanning module using the calibration module shown in FIG. 1 for adjusting the resolution.

Please refer to FIG. 3 and FIG. 4. FIG. 3 is a perspective view of a calibration module 40. FIG. 4 is a schematic diagram of the scanning module 14 using the calibration module 40 for adjusting the resolution of the scanning module 14. The calibration module 40 comprises a calibration picture 42 installed at the bottom of the calibration module 40 for calibrating the resolution of the sensor 22 in two different directions, and four props 44 for supporting the calibration module 40 at a fixed height. The calibration picture 42 comprises two groups of parallel lines 46,48 with two different directions. The image generated by the first group of parallel lines is perpendicular to the direction that the sensing units of the sensor 22 are arranged. The resolution of the sensor 22 is measured in the direction corresponding to that of the first group of parallel lines. The image generated by the second group of the parallel lines 48 forms an angle with the linear orientation of the sensor ranging from 8 to 15 degrees. The resolution of the sensor 22 is measured in the direction corresponding to that of the second group of parallel lines. The resolutions of the two groups of parallel lines 46,48 are both less than the resolution of the sensor 22 in the directions corresponding to the two directions of the two groups of lines. This prevents the sensor 22 and the two groups of parallel lines 46,48 from having the same resolutions and thus generating correspondent position errors that make the resolution unreal. Also, the height of the props 44 is equal to the distance between the line-shaped opening 30 of the scanning module 14 and the transparent platform 18 of the scanner. Therefore, when the calibration module 14 is used to calibrate the resolution of the scanning module 14, the distance between the calibration picture 42 and the scanning module 20 is just equal to the distance between the scanning module 20 and the scanned document. This makes the calibration process more accurate.

When adjusting the resolution of the scanning module 14, the calibration module 40 is installed on the scanning module 14 and the calibration picture 42 is positioned above the line-shaped opening 30. The image of the calibration picture 42 is thus transmitted by the mirror module 26 and the lens 24 onto the sensor 22. Accordingly, the position of the lens 24 can be adjusted until the resolution generated by the two groups of parallel lines 46,48 of the calibration picture 42 in the two mutual perpendicular directions are roughly equal.

Figure 5:
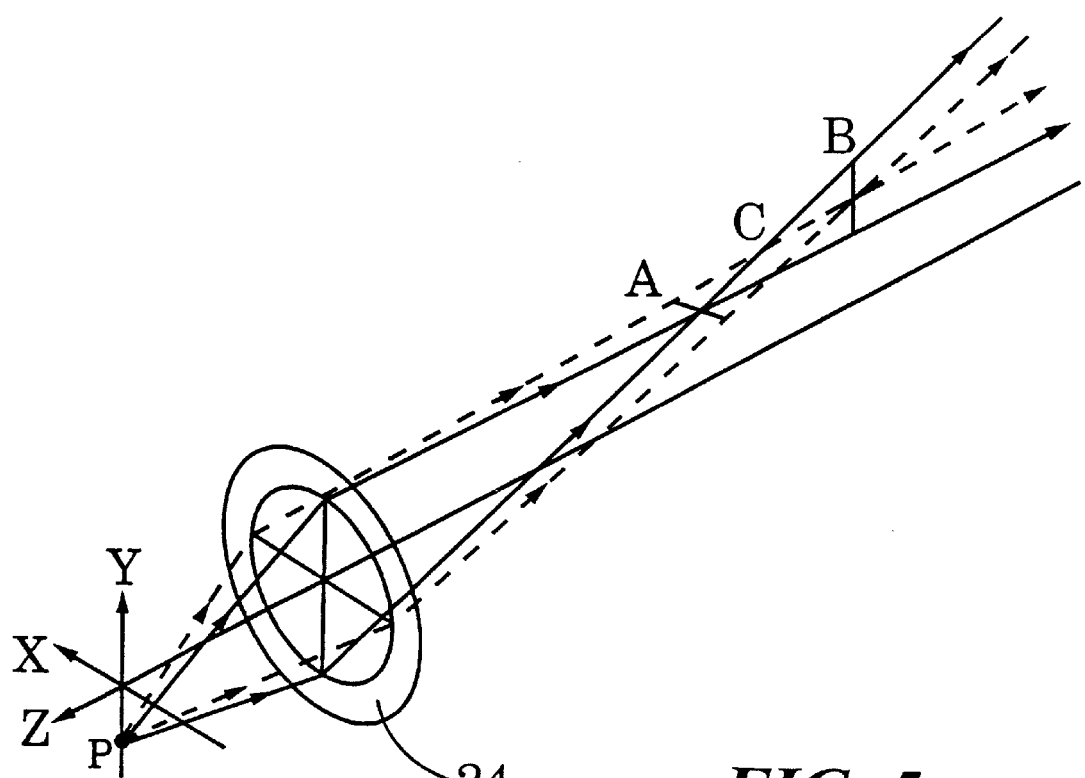
FIG. 5 is a schematic diagram of focusing positions of the lens shown in FIG. 2 in different directions.
Figure 6:
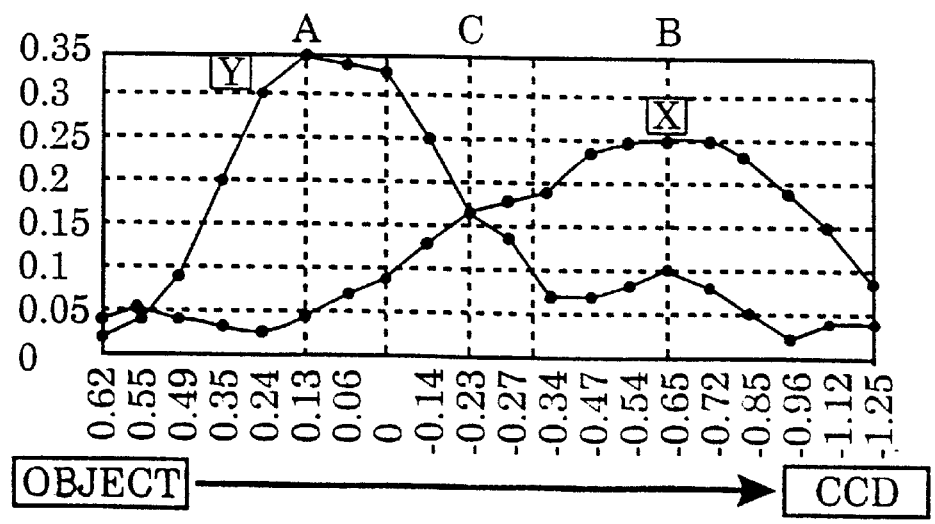
FIG. 6 is a schematic diagram of the resolution of the images generated by the two groups of perpendicular lines shown in FIG. 3.

Please refer to FIG. 5 and FIG. 6. FIG. 5 shows focusing positions of the lens 24 in different directions. FIG. 6 shows the resolution of the image generated by the two groups of parallel lines 46,48. In FIG. 5, the y-axis indicates the direction perpendicular to the direction in which the sensing units are arranged, the x-axis indicates the direction parallel to the direction in which the sensing units are arranged, and the z-axis indicates the relative positions of the calibration picture 42 and the sensor 22. When an image goes from point P through the lens 24 to point A, the amplitude of the correspondent image signal is biggest on the y-axis (the best resolution focus of the y-axis) but is small on the x-axis. When the image arrives at point C, the amplitudes of the image signal on the x- and y-axes are roughly equal although not maximized. When the image arrives at point B, the amplitude of the image signal is biggest on the x-axis (the best resolution focus of the x-axis) but small on the y-axis. Therefore, the lens 24 must be moved to a position allowing the sensor 22 to be at point C to make the resolutions of the image signal on the x- and y-axes roughly equal.

Figure 7:
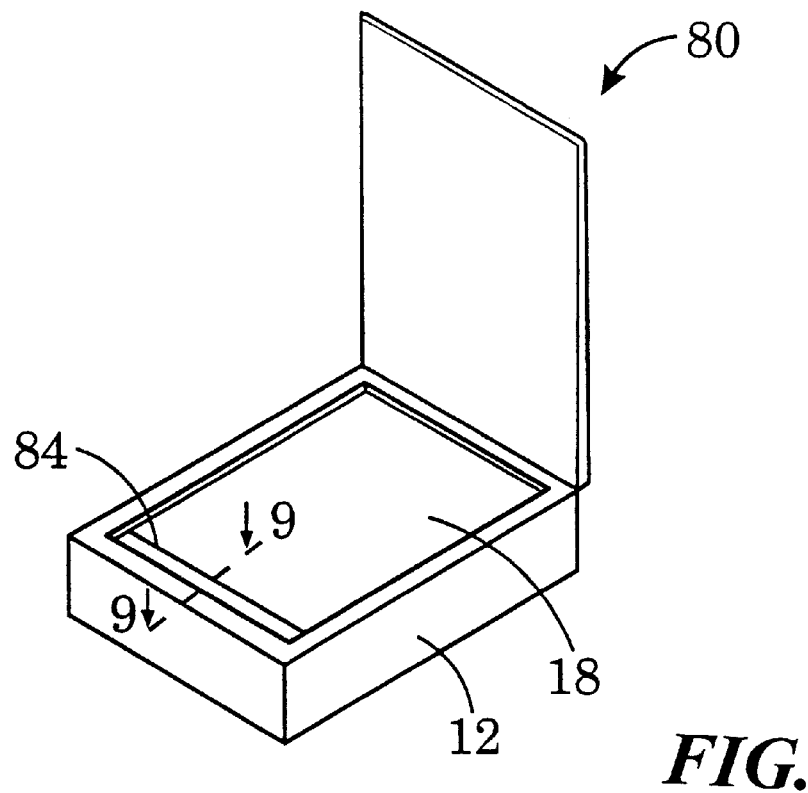
FIG. 7 is a schematic diagram of another embodiment of the scanner according to the present invention.
Figure 8:
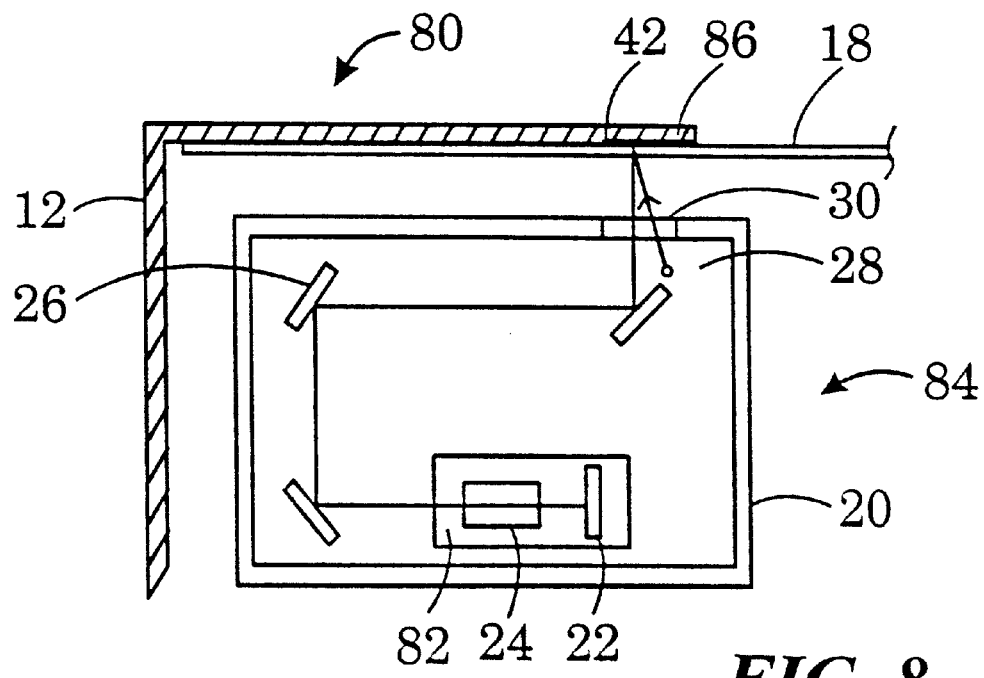
FIG. 8 is a sectional view along line 9—9 of the scanner shown in FIG. 7.
Figure 9:
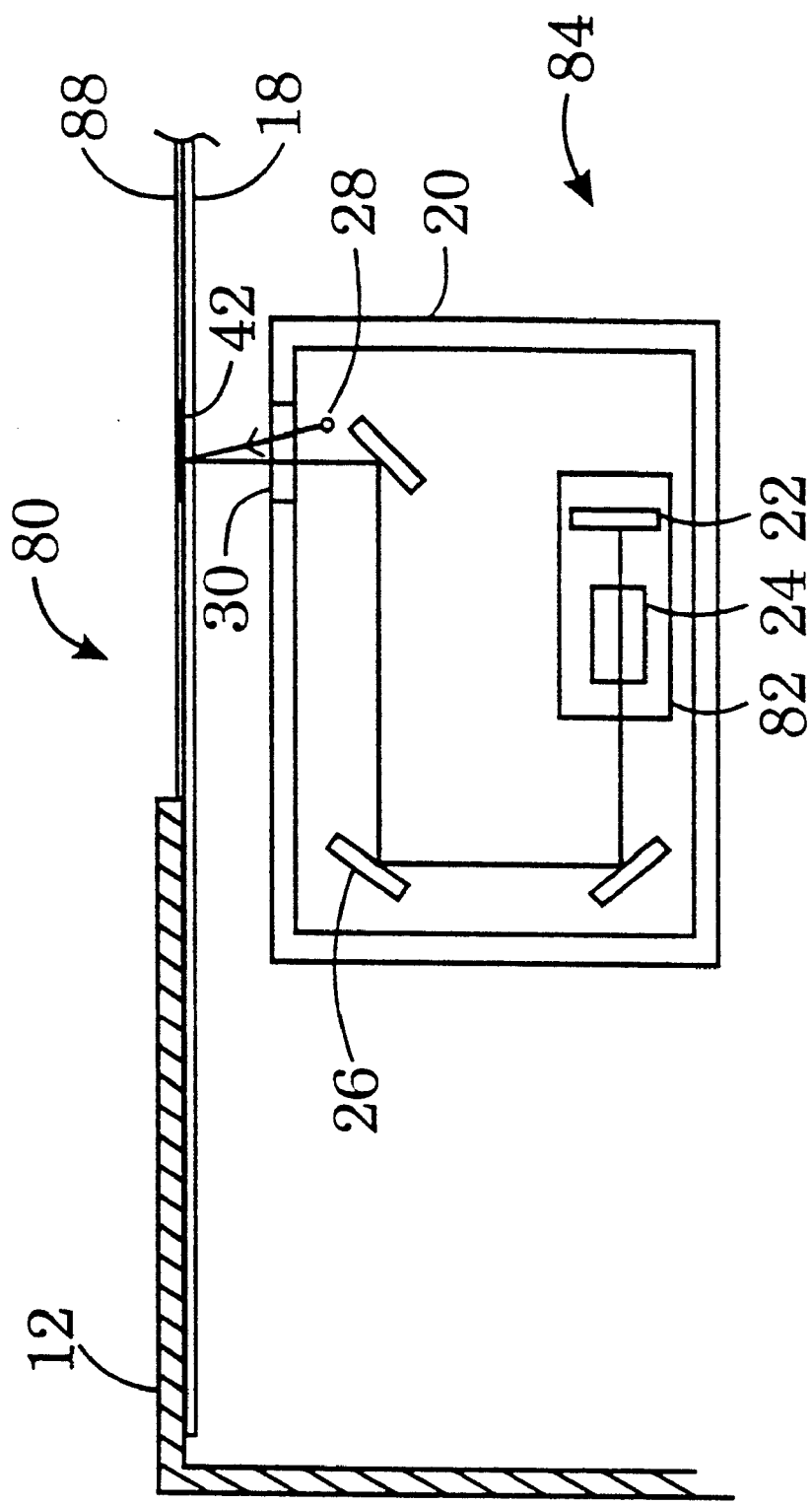
FIG. 9 is a schematic diagram of another embodiment of the scanner shown in FIG. 8.

Please refer to FIG. 7, FIG. 8, and FIG. 9. FIG. 7 is a schematic of another embodiment of the scanner 80 according to the present invention. FIG. 8 is a sectional view along line 9—9 of the scanner 80. FIG. 9 shows another embodiment of the scanner 80. The scanner 80 comprises a housing 12 with a transparent platform 18 on its top,for placing a document, a scanning module 84 movably installed in the housing 12 for scanning the document, a driving device (not shown) installed in the housing 12 for driving the scanning module 14, and a control device (not shown) installed in the housing 12 for controlling the operation of the scanner 80.

The scanning module 84 of the scanner 80 comprises a case 20 with a line-shaped opening 30 on the top for receiving the light from the document, a light source 28 installed in the case 20 for illuminating the document, a sensor 22 installed in the case 20 for transforming the light into correspondent image signals, a mirror module 26 installed in the case 20 for passing the light from the document through the lens 24 to the sensor 22, and a lens 24 adjustably installed in the case 20 for converging the light from the document to the sensor 22.

The scanning module 84 further comprises a moving box 82 movably installed in the case 20 for mounting the lens 24 and the sensor 22, and a adjustment device (not shown) installed in the case 20 for adjusting the position of the lens 24 to change the resolution of the scanning module 84.

In FIG. 8, the calibration picture 42 used to calibrate the resolution of the scanning module 84 is 10 placed on the underside of the case 12 at position 86. When adjusting the resolution of the scanning module 84, the control device uses the driving device to move the scanning module 84 below the calibration picture 42 to enable the reflected light from the calibration picture 42 to pass through the line-shaped opening 30 of the case 20 to the mirror module 26 and the lens 24 and finally to the sensor 22.

Then, the control device controls the adjustment device according to the light transmitted from the calibration picture 42 to move the moving box 82 until the resolutions indicated by the magnitudes of the image signals corresponding to the two groups of parallel lines 46,48 of the calibration picture 42 are roughly equal.

It can be seen from FIG. 9 that the calibration picture 42 need not be necessarily placed on the scanner 80. It also can be drawn onto a document 88 then placed onto the transparent platform 18 to calibrate the scanning module 84 before scanning.

As opposed to the prior art resolution adjustment method of scanning modules, the resolution adjustment method of the present invention uses the calibration picture 42 comprising two groups of parallel lines 46,48 with different directions to calibrate the scanning module 84. The images generated by the first group of the parallel lines 46 of the calibration picture are perpendicular to the linear orientation of the sensor 22 for measuring the resolution of the sensor along its linear orientation. The images generated by the second group of parallel lines 48 of the calibration picture are close to but not exactly parallel to the linear orientation of the sensor 22 for measuring the resolution of the sensor 22 along a direction perpendicular to the linear orientation of the sensor 22. The lens 24 therefore can be adjusted to a position allowing the resolutions in two perpendicular directions to be almost equal.

Those skilled in the art readily observe that numerous modifications and alterations of the device may be made while retaining the teachings of the inventions. Accordingly, the above mentioned disclosure should be construed as limited only by the metes and bounds of the appended claims.

What is claimed is:

1. A resolution adjustment method for adjusting the resolution of a scanning module which is installed in a scanner for scanning a document, the scanning module comprising:

a case with a line-shaped opening on its top for receiving light from the document;

a sensor installed in the case having a plurality of linearly arranged sensing units for converting the light from the document through the line-shaped opening of the case into correspondent image signals;

a lens installed in the case for converging the light from the document onto the sensor; and a mirror module installed in the case for passing the light from the document to the sensor;

the resolution adjustment method comprising the following steps:

(1) providing a calibration picture to the scanning module to generate a calibration image which comprises two groups of parallel lines of different directions for calibrating the resolution of the sensor in two different directions; and (2) measuring the magnitude of the image signals corresponding to the two groups of parallel lines and adjusting the scanning module until the magnitude of the image signals corresponding to the two groups of parallel lines are roughly equal.

2. The resolution adjustment method of claim 1 wherein the scanning module further comprises a light source for illuminating the document placed above the line-shaped opening of the case wherein the calibration picture is positioned above the line-shaped opening and the light reflected from the calibration picture is passed by the mirror module and the lens to the sensor.

3. The resolution adjustment method of claim 1 wherein the calibration picture is positioned under a calibration module which is attached to the line-shaped opening of the case when adjusting the scanning module wherein the light reflected from the calibration picture is passed by the mirror module and the lens to the sensor.

4. The resolution adjustment method of claim 3 wherein the lens is adjustably installed in the case and the position of the lens is adjusted when adjusting the scanning module until the magnitude of the image signals corresponding to the two group of parallel lines in the calibration picture are roughly equal.

5. The resolution adjustment method of claim 1 wherein the scanner comprises:

a housing with a transparent platform on its top for placing the document wherein the scanning module is movably installed in the housing for scanning the document;

a driving device installed in the housing for driving the scanning module to scan the document; and a control device installed in the housing for controlling the scanner.

6. The resolution adjustment method of claim 5 wherein when adjusting the scanning module, the calibration picture is placed on the transparent platform of the housing, and the scanning module is moved to scan the calibration picture wherein the light reflected from the calibration picture is passed through the line-shaped opening of the scanning module to the sensor.

7. The resolution adjustment method of claim 5 wherein the calibration picture is placed on a document which is placed on the transparent platform of the housing when adjusting the resolution of the scanning module.

8. The resolution adjustment method of claim 5 wherein the scanner further comprises an adjustment device installed in the case of the scanning module for adjusting the resolution of the scanning module wherein when adjusting the scanning module, the control device uses the adjustment device to adjusting the resolution of the scanning module according to the light from the calibration picture until the magnitude of the image signals corresponding to the two groups of parallel lines of the calibration picture are roughly equal.

9. The resolution adjustment method of claim 8 wherein the adjustment device is used to adjust the position of the lens so as to change the resolution of the scanning module.

10. The resolution adjustment method of claim 8 wherein the calibration picture is placed in the housing and the scanning module is moved to scan the calibration picture when adjusting the scanning module.

11. The resolution adjustment method of claim 8 wherein the calibration picture is placed on a document which is placed on the transparent platform of the housing when adjusting the resolution of the scanning module.

12. The resolution adjustment method of claim 1 wherein the images generated by the first group of the parallel lines of the calibration picture are perpendicular to the linear orientation of the sensor for measuring the resolution of the sensor along its linear orientation, and the images generated by the second group of parallel lines of the calibration picture are close to but not exactly parallel to the linear orientation of the sensor for measuring the resolution of the sensor along a direction perpendicular to the linear orientation of the sensor.

13. The resolution adjustment method of claim 12 wherein the images generated by the second group of parallel lines forms an angle with the linear orientation of the sensor ranging from 8 to 15 degrees.

14. The resolution adjustment method of claim 1 wherein the sensor is a linear charge coupled device (CCD).

* * * * *